(12) United States Patent
Moudilou et al.

(10) Patent No.: US 9,764,365 B2
(45) Date of Patent: Sep. 19, 2017

(54) SULFOALUMINATE CLINKER BASED HYDRAULIC BINDER AND USE THEREOF IN A PROCESS FOR TREATING POLLUTED SOILS

(71) Applicant: Ciments Francais

(72) Inventors: Emmanuel Moudilou, Breuilpont (FR); Cyril Guerandel, Paris (FR); Bruno Le Rolland, Oinville sur Montcient (FR); Stephanie Delair, Poissy (FR)

(73) Assignee: CIMENTS FRANCAIS, Puteaux (FR)

( * ) Notice: Subject to any disclaimer, the term of this patent is extended or adjusted under 35 U.S.C. 154(b) by 50 days.

(21) Appl. No.: 14/400,865

(22) PCT Filed: May 13, 2013

(86) PCT No.: PCT/FR2013/051045
§ 371 (c)(1),
(2) Date: Nov. 13, 2014

(87) PCT Pub. No.: WO2013/171419
PCT Pub. Date: Nov. 21, 2013

(65) Prior Publication Data
US 2015/0158063 A1 Jun. 11, 2015

(30) Foreign Application Priority Data
May 14, 2012 (FR) ...................... 12 54395

(51) Int. Cl.
| C04B 28/06 | (2006.01) |
|---|---|
| B09C 1/08 | (2006.01) |
| C04B 7/32 | (2006.01) |
| B09B 3/00 | (2006.01) |
| C04B 7/00 | (2006.01) |
| C04B 111/00 | (2006.01) |

(52) U.S. Cl.
CPC .............. B09C 1/08 (2013.01); B09B 3/0041 (2013.01); C04B 7/006 (2013.01); C04B 7/323 (2013.01); C04B 28/065 (2013.01); B09C 2101/00 (2013.01); C04B 2111/00767 (2013.01); Y02W 30/91 (2015.05); Y02W 30/92 (2015.05); Y02W 30/94 (2015.05)

(58) Field of Classification Search
CPC ....... C04B 28/065; C04B 7/006; C04B 7/323; C04B 7/02; C04B 14/02; C04B 18/08; C04B 18/141; C04B 18/146; C04B 22/0064; C04B 2103/0096; C04B 2103/12; C04B 2111/00767; B09C 1/08; B09C 2101/00; B09B 3/0041
See application file for complete search history.

(56) References Cited

U.S. PATENT DOCUMENTS

| 4,798,628 | A | * | 1/1989 | Mills ...................... C04B 7/323 |
| | | | | 106/692 |
| 5,114,487 | A | * | 5/1992 | Gartshore ............. C04B 28/065 |
| | | | | 106/640 |
| 5,562,587 | A | | 10/1996 | Kessler et al. |
| 6,730,162 | B1 | | 5/2004 | Li et al. |
| 2003/0183131 | A1 | | 10/2003 | Classen et al. |
| 2007/0084383 | A1 | | 4/2007 | Sommain |
| 2009/0156878 | A1 | | 6/2009 | Cau Dit Coumes et al. |
| 2011/0185950 | A1 | * | 8/2011 | Cassat ................... C04B 18/021 |
| | | | | 106/694 |

FOREIGN PATENT DOCUMENTS

| EP | 0 353 062 A2 | 1/1990 |
| EP | 0 439 372 A2 | 7/1991 |
| EP | 0 588 689 A | 3/1994 |
| EP | 1 306 356 A1 | 5/2003 |
| EP | 1 384 704 A1 | 1/2004 |
| EP | 1 775 270 A2 | 4/2007 |
| FR | 2 807 424 A1 | 10/2001 |
| FR | 2 841 897 A1 | 1/2004 |
| FR | 2 868 772 A1 | 10/2005 |
| FR | 2892116 A1 * | 4/2007 |
| FR | 2 901 270 A1 | 11/2007 |
| GB | 1 345 586 A | 1/1974 |
| GB | 2 175 295 A | 11/1986 |
| WO | 2010/043495 A1 | 4/2010 |

OTHER PUBLICATIONS

International Search Report, dated Sep. 2, 2013, from corresponding PCT application.

* cited by examiner

Primary Examiner — Anthony J Green
(74) Attorney, Agent, or Firm — Ipsilon USA, LLP

(57) ABSTRACT

A hydraulic binder based on a sulfoaluminate clinker including the mineralogical phases ye'elimite $C_4A_3\$$, mayenite $C_{12}A_7$, free lime CaO, and optionally belite C2S, characterized in that, in the clinker, the mineralogical phases are 20% to 50% by weight of ye'elimite C4A3$ phase, 5% to 80% by weight of mayenite $C_{12}A_7$ phase, and 1% to 5% by weight of free lime CaO, the weight ratio between the mayenite $C_{12}A_7$ and ye'elimite $C_4A_3\$$ phases being between 0.1 and 10. The binder can be used to treat polluted soils, in particular soils with a leachable fraction greater than 0.4% that contains predominantly anions and/or heavy metal cations by mixing the soil with the hydraulic binder, in soil/binder weight proportions of between 1 and 40 parts of binder for 100 parts of soil. It makes it possible to stabilize soils which are polluted or to stabilize soils before dumping.

15 Claims, 1 Drawing Sheet

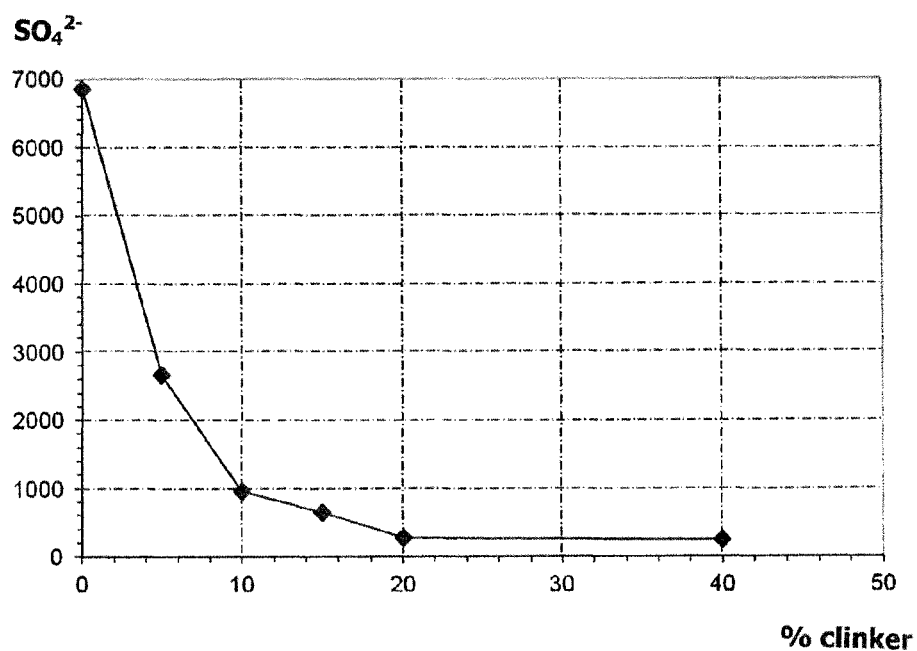

SULFOALUMINATE CLINKER BASED HYDRAULIC BINDER AND USE THEREOF IN A PROCESS FOR TREATING POLLUTED SOILS

The present invention relates to a novel sulfoaluminate hydraulic binder and to its use in the context of the treatment of polluted soils.

A subject matter of the present invention is a hydraulic binder comprising mineralogical phases placing it in the category of the sulfoaluminate binders. Another subject matter of the present invention is the use of this binder in the treatment of a material, in particular of a soil or an earth, polluted or contaminated by ionic chemical entities or heavy metals. The treated material remains loose but the leaching of the polluting entities is reduced.

The landfilling of soils contaminated by pollutants, in particular soils originating from industrial sites, complies with strict regulations (Directive 1999/31/EC of the Council of Apr. 26, 1999 and Decision No. 2003/33/EC of Dec. 19, 2002). The forms for landfilling these soils are determined according to their classes of pollution. These classes range from class I (dangerous waste) to class III (inert waste). The more dangerous a soil is regarded as being, the more the landfilling thereof results in constraints and consequently in a high cost. In order to be able to store these contaminated soils in landfills, at the lowest cost, it is advisable to lower the class of dangerousness thereof. This modification to the class of dangerousness can in particular be obtained by lowering the content of leachable pollutants present in the soil.

Lowering the class of dangerousness can also make it possible to reemploy the soils thus treated, for example in road bases or in backfills (in accordance with the SETRA guide "Acceptabilité de matériaux alternatifs en technique routière. Evaluation environnementale" [Acceptability of alternative materials in road engineering. Environmental Evaluation], March 2011).

In cement terminology, the primary compounds are represented by C for CaO, S for $SiO_2$, A for $Al_2O_3$, \$ for $SO_3$ and H for $H_2O$, which will be used throughout the present text.

Hydraulic binders are already used for the treatment of industrial effluents (liquid wastes) and incineration residues in a finely divided form, in particular to trap certain anions. This is the case in particular with the hydraulic binders sold by Kerneos under the trade name LSR and described in the European patent EP 0 588 689, which are high-alumina cements. The predominant mineralogical phases of these high-alumina cements are CA or CA and $C_{12}A_7$ or $C_3A$ and $C_{12}A_7$.

The finely divided wastes are first treated with a high-alumina binder comprising three predominant phases $C_3A$, $C_{12}A_7$ and CaO. The treated product thus obtained is subsequently crushed and the aggregates are coated in a cement of Portland type to improve their resistance to leaching. This process thus requires a large amount of coating binder. In addition, the patent discloses the final content of chlorides of the leachate after curing for 28 days but gives no information on the content of sulfate ions. Two types of high-alumina binders are described comprising the respective phases $C_3A/C_{12}A_7/CaO$ in proportions of 20/80/0 and 80/0/20. No reference is made to a $C_4A_3$\$ phase.

Binders intended in particular for rendering inert and treating polluted soils are also known which are sold by Holcim under the trade name Inercem. These binders are mixtures of clinker (Portland) and blast furnace slag. The different products are: Inercem P (more than 65% of clinker and less than 20% of slag), Inercem S (more than 80% of slag and more than 10% of clinker) and Inercem midway between the two preceding products (less than 30% of clinker and more than 60% of slag). These products are described in the commercial brochure: "Inercem Liants hyrauliques pour stabilisation des déchets courants" [Inercem Hydraulic binders for the stabilization of everyday wastes] (Holcim Belgique, February 2009).

It is apparent that these binders are not sufficiently effective to trap the sulfate ions when the soil to be treated is polluted by such readily leachable anions, which are released into rainwater or infiltration water.

A first aim of the invention is thus to provide a hydraulic binder capable of trapping anions, such as sulfate ions and chloride ions, and/or heavy metals present in contaminated materials, in particular polluted soils, and of limiting their leaching.

Another aim of the invention is to provide a hydraulic binder which makes it possible to treat and render inert a polluted soil in a single stage and in situ, that is to say which does not require transfer to another site.

A further aim of the invention is to provide a hydraulic binder which makes it possible to treat and render inert a polluted soil before it is landfilled.

Another aim of the invention is thus to provide a hydraulic binder capable of treating the polluted soil by addition of binder in a small amount, making it possible to reduce the cost of the treatment in comparison with the binders and processing methods of the prior art.

To this end, the present invention provides a novel hydraulic binder based on sulfoaluminate clinker, said clinker comprising the ye'elimite $C_4A_3$\$, mayenite $C_{12}A_7$, free lime CaO and optionally belite $C_2S$ mineralogical phases, the ye'elimite not representing more than 50% of the weight of the clinker and the ratio by weight of the mayenite $C_{12}A_7$ phase to the ye'elimite $C_4A_3$\$ phase being between 0.1 and 10.

The present invention provides a novel hydraulic binder based on sulfoaluminate clinker, said clinker comprising the ye'elimite $C_4A_3$\$ mineralogical phase, mayenite $C_{12}A_7$ mineralogical phase, free lime CaO and optionally belite $C_2S$ mineralogical phase, characterized in that, in said clinker, the ye'elimite $C_4A_3$\$ mineralogical phase, mayenite $C_{12}A_7$ mineralogical phase and free lime CaO mineralogical phases are present in the following proportions:

from 20% to 50% by weight of ye'elimite $C_4A_3$\$ phase,
from 5% to 80% by weight of mayenite $C_{12}A_7$ phase,
and from 1% to 5% by weight of free lime CaO, and the ratio by weight of the mayenite $C_{12}A_7$ phase to the ye'elimite $C_4A_3$\$ phase being between 0.1 and 10.

As will be seen later, this hydraulic binder, which includes a sulfoaluminate clinker (and not a high-alumina clinker, like the LSR products), is capable of being used for the stabilization of polluted soils, in order to create stable chemical entities, in particular ettringite but also stratlingite or hydrocalumite, within said soils. The use of this binder can thus make it possible to treat a contaminated soil in situ and to change its landfill admission class.

Sulfoaluminate clinker should be understood as meaning a clinker which includes a minimum of 20% of $C_4A_3$\$ mineralogical phase.

It should be noted that the $C_{12}A_7$ mineralogical phase is a phase which is usually encountered in high-alumina binders. In the context of sulfoaluminate binders, the $C_{12}A_7$ phase is regarded by a person skilled in the art as a burning intermediate, indicating that the conditions for burning the raw mix are not optimum. The main product which a person skilled in the art is trying to obtain for sulfoaluminate clinkers is the $C_4A_3\$$ mineralogical phase and not the $C_{12}A_7$ phase. The hydraulic binder according to the present invention is a product which under normal circumstances would be regarded as "imperfect" by a person skilled in the art.

In the context of the present invention, the $C_{12}A_7$ phase encompasses any isotypic $C_{12}A_7$ structure, such as, for example, $C_{11}A_7.CaF_2$, the structure of which results from a replacement of $O^{2-}$ ions by $F^-$ ions. In the continuation of the description and of the claims, $C_{12}A_7$ should be understood as meaning $C_{12}A_7$ or any isotypic structure.

The main active mineralogical phases of this sulfoaluminate clinker are ye'elimite $C_4A_3\$$, mayenite $C_{12}A_7$ and lime CaO. Belite, which is possibly also present, contributes to the mechanical strength of the material treated with this binder and participates in the decontamination of the material (treated soil) by the chemical stabilization of the hydration products of the sulfoaluminate compounds.

Preferably, the hydraulic binder includes a sulfoaluminate clinker which comprises from 5% to 50% by weight of mayenite $C_{12}A_7$ phase.

The hydraulic binder includes a sulfoaluminate clinker which can comprise from 10% to 40% by weight of belite $C_2S$ phase.

The hydraulic binder includes a sulfoaluminate clinker which can additionally comprise up to 5% by weight of C$ phase.

It turns out that the "decontaminating" properties of the hydraulic binder according to the present invention are further improved when, in the clinker, the ratio by weight of the mayenite $C_{12}A_7$ phase to the ye'elimite $C_4A_3\$$ phase is between 0.1 and 2.5, preferably between 0.15 and 1.5.

Preferably, the hydraulic binder is based on sulfoaluminate clinker which includes less than 0.5% by weight of $CA_2$ phase and less than 0.5% by weight of $C_2AS$ phase.

Preferably, the hydraulic binder is based on sulfoaluminate clinker which includes more than 10% by weight of mayenite $C_{12}A_7$.

Ordinarily, the sulfoaluminate clinker according to the present invention can be obtained by burning minerals in a cement kiln but they can also be obtained by mixing different sources of clinker, indeed even by addition of pure mineralogical phases to an industrial sulfoaluminate clinker in order to enrich it in mineralogical phases, in particular in ye'elimite and in mayenite.

The hydraulic binder according to the present invention has proved to be particularly effective when it is composed exclusively of the sulfoaluminate clinker as described above.

It is also effective for treating polluted soils when it includes at least 10%, in particular at least 20%, preferably at least 30%, by weight of said sulfoaluminate clinker and one or more compound(s) chosen from cement, Portland clinker, lime, in particular quick lime, a filler (chemically inert compound), admixtures having a pozzolanic effect (having a role in the development of long-term strengths), such as slag, fly ash, silica fume or pozzolana, and optionally one or more additives, such as a setting accelerator and/or a chromium reducer.

Advantageously, the hydraulic binder includes quick lime, in particular less than 50%, preferably from 5% to 30%, more preferably from 10% to 20%, by weight of lime.

Advantageously, the hydraulic binder does not include fibers, in particular metal fibers.

Preferably, the binder according to the present invention includes less than 30% by weight, preferably less than 10% by weight, more preferably less than 5% by weight, of Portland clinker.

Advantageously, the hydraulic binder includes more than 2%, preferably more than 5%, more preferably more than 10%, by weight of ye'elimite.

Advantageously, the hydraulic binder includes more than 2%, preferably more than 5%, more preferably more than 10%, by weight of mayenite.

The present invention also relates to a process for the treatment of polluted soils, in particular of soils exhibiting a leachable fraction of greater than 0.4%, said leachable fraction predominantly including anions, in particular sulfate ions, and/or heavy metal cations, the process being characterized in that it comprises the mixing of said soil with a hydraulic binder as described above, in soil/binder proportions by weight of between 1 and 40 parts of binder per 100 parts of soil.

Preferably, the treatment process comprises the mixing of said soil with the hydraulic binder in soil/binder proportions by weight of between 1 and 20 parts, preferably from 2 to 20 parts, more preferably from 5 to 20 parts, more preferably from 5 to 10 parts of binder per 100 parts of soil.

The soil thus treated remains easy to handle (to shovel or transport). It is not necessary to allocate to it an additional coating stage in order to limit the release of the anions, such as chlorides or sulfates.

Preferably, the treatment process is suitable for the treatment of soil including a water content of less than 40%, in particular less than 30%, preferably of less than 20%, by weight of water.

The process of the present invention has an advantageous use in the stabilization of polluted soils in situ or before landfilling, which soils are polluted in particular by sulfate ions and/or chloride ions and/or heavy metal cations.

The material thus treated can subsequently be reemployed in road bases or in backfills.

BRIEF DESCRIPTION OF THE DRAWINGS

The present invention will be described in more detail in the nonlimiting implementational examples below in connection with the single appended FIGURE, which gives a diagrammatic representation of the variation in the content of sulfate ions in the leachate as a function of the percentage by weight of hydraulic binder.

DETAILED DESCRIPTION

Examples

1—Preparation of the Clinkers

The clinkers according to the present invention are prepared by high-temperature burning of a raw mix composed in particular of limestone, gypsum, clay and bauxite which are mixtures of different oxides, in particular CaO, $SiO_2$, $SiO_2$, $Al_2O_3$, $Fe_2O_3$ and $SO_3$. The art of putting together this raw mix is well known to a person skilled in the art (*Special Inorganic Cement*, Ivan Older, 2000, E&FN Spon, New York).

It is important to note that, in the context of the present invention, the starting materials constituting the raw mix (mixture of the minerals before burning) are proportioned in order to obtain a sulfoaluminate hydraulic binder and not a high-alumina hydraulic binder.

The overall proportions of these various oxides are determined from three modules managing the saturation with lime (Cm), the distribution of the sulfates (Ps) and the high-alumina nature (N).

The Cm module has to be approximately 1.

The Ps module has to be less than 3.82.

The N module has to be less than 2.

In the present case, the synthesis of the clinker is carried out by the semi-wet route.

The raw mix is mixed with water (approximately 10% by weight), in order to obtain a paste which can be molded, and is then manually shaped into "sausages" with a length and diameter of the order of 25 cm and 3 cm respectively. The raw mix thus shaped is stored at 110° C. for approximately 12 hours.

The raw mix is subsequently burnt in a muffle furnace at 1300° C. for approximately 1 hour, in order to obtain the clinker. The clinker is cooled in ambient air and then ground in order to obtain a Blaine fineness of approximately 4000 cm²/g and a particle size of less than 40 micrometers approximately. The mineralogical compositions of three sulfoaluminate clinkers according to the invention are presented in table 1 (as percent by weight).

TABLE 1

|  | Clinker 1 | Clinker 2 | Clinker 3 |
| --- | --- | --- | --- |
| $C_4A_3\$$ | 31.6 | 24.4 | 26.3 |
| $C_2S$ | 29 | 22.4 | 24.1 |
| $C\$$ | 3.1 | 2.4 | 2.6 |
| $C_{12}A_7$ | 9.8 | 30.7 | 25 |
| $C_4AF$ | 11 | 8.5 | 9.2 |
| CT | 2.3 | 1.8 | 1.9 |
| MgO | 1.7 | 1.4 | 1.4 |
| C | 1.2 | 0.9 | 1 |
| $CaCO_3$ | 3 | 2.3 | 2.5 |

2—Treatment Process

The process for the treatment of a contaminated material (such as a polluted soil) with a sulfoaluminate hydraulic binder based on sulfoaluminate clinker according to the invention was carried out according to the following stages:

An amount of crude earth is sieved at 4 mm (Saulas, France, Sieve, certified NF ISO 3310), so as to obtain 1 kg of earth to be treated (contaminated material).

1 kg of sieved earth to be treated (contaminated material) is placed in a mixer (MLX40D, CAD France) in the presence of a predetermined amount of sulfoaluminate hydraulic binder, expressed as % by weight of binder with respect to the weight of contaminated material.

The earth/binder mixture is then subjected to a stage of homogenization by slow-speed mixing (140 revolutions/minute) for 1 minute. The water is then added according to a water/binder ratio by weight equal to 1.

The combined mixture is then mixed at slow speed for 2 minutes and then at high speed (285 revolutions/minute) for 2 minutes. The entire contents of the mixer are then poured into a plastic bag (polyethylene bag, 3 liters), which is then hermetically closed so as to simulate storage in a pile. The treated earth is matured over a period of time of 1 week at ambient temperature.

The treated material is subsequently dried at 40° C. in an oven and then optionally crushed (BB 200 Tungsten Carbide, Retsch, Germany) to a particle size <4 mm in order to carry out the leaching tests.

3—Leaching Process

In accordance with the abovementioned Directive which defines the classes of dangerousness, the standard NF EN-12457-2 was used.

The tests are carried out on a material, at least 95% of the particles (by weight) of which have a size less than the 4 mm sieve.

A sample of 350 g of crude material is sieved with the 4 mm sieve. The oversize at 4 mm is subjected to crushing in order to obtain a zero oversize at this sieve, and the combined product is mixed in order to obtain the sample which will be subjected to the leaching test.

For the analyses and the leaching tests, the weight of dry matter ($w_d$) of the sample is determined after transfer to an oven at 105° C.±5° C. to a constant weight in accordance with the standard ISO 11465.

Leaching Test

The starting sample $w_{leach}$ is 90 g±0.5 g (measured with an accuracy of 0.1 g) of dry matter.

The leaching test is carried out at ambient temperature, i.e. 20° C.±5° C., in a one liter flask in the presence of an amount of leachant (deionized water, 18 MΩ) equivalent to a liquid/solid (L/S) ratio by weight of 10±2%. The stoppered flask is placed in an overhead shaker (Heidolph REAX 20) at approximately 10 revolutions/min and shaken for 24 hours±0.5 h.

In addition to the samples, leaching "blanks" are also carried out.

After halting the shaking, the suspended solids are left to settle out for 15 min±5 min and then filtered under vacuum through a 0.45 μm membrane filter.

The eluate is subsequently divided into an appropriate number of subsamples for the different chemical analyses and is stored according to the standard EN ISO 5667-3.

The analysis of the elements (heavy metals) is carried out by ICP-AES (inductively coupled plasma-atomic emission spectrometry) analysis (*Iris Advantage, Thermo Jarrell Ash*) according to a protocol in accordance with the standard NF EN ISO 11885.

The analysis of the anions is carried out by ion chromatography (ICS 2000, Dionex, USA) according to a procedure in accordance with the standard NF EN ISO 10304-1.

The soluble fraction (SF) is calculated according to the following equation:

$$SF = \frac{[(w_1 - w_0)(0.9 + (0.001 \times w_{leach} \times c_{moisture})]}{(0.001 \times V_{ext} \times w_{leach} \times (1 - c_{moisture}))}$$

$w_1 - w_0 = w_d$ = weight of the sample dried in the oven at 105° C. (in grams)

$w_{leach}$ = weight of the sample for leaching (in grams)

$c_{moisture}$ = moisture content of the sample (in grams)

$V_{ext}$ = volume withdrawn for measuring the solids content (in milliliters).

In the continuation of the document, SF is expressed as %. In the abovementioned Directives, SF is expressed in mg/kg. The value of 1% is equivalent to 10 000 mg/kg.

Reference Samples

All the tests carried out here were carried out starting from earth from the Autonomous Port of Paris, earth excavated from a former industrial site where an incineration plant was active at Issy-les-Moulineaux near Paris.

The earth from the Port of Paris constitutes a polluted soil, also known as contaminated material, within the meaning of the present invention, the substrate being the earth and the pollutants being the different elements or ions present in significant amounts in this earth.

Sample 1

Sample 1 is a crude sample of earth from the Autonomous Port of Paris. This sample 1 has not been subjected to leaching. It includes a water content of approximately 15% by weight.

Sample 2

Sample 2 corresponds to the analysis of a leachate of earth from the Port of Paris.

The assays of the different pollutants present in the crude sample 1 and with regard to the leachate (sample 2) are combined in table 2.

The values of the elements and ions assayed are expressed in mg/kg of dry matter.

The soluble fraction represents the total amount of chemical elements passing into solution with respect to the amount of initial dry material, expressed as % of dry matter.

TABLE 2

|  | Sample 1 | Sample 2 |
| --- | --- | --- |
| As | 53 | <0.2 |
| Ba | 769 | 0.471 |
| Cd | 5 | 0.114 |
| Cu | 798 | 0.253 |
| Hg | <3 | <0.1 |
| Ni | 107 | 0.127 |
| Pb | 1454 | 0.115 |
| Sb | 47 | <0.2 |
| Se | <5 | <0.2 |
| Zn | 1163 | 0.375 |
| $Cl^-$ | 68.7 | 68.7 |
| $SO_4^{2-}$ | 9400 | 6859 |
| SF (Soluble fraction) | — | 1.18 |

The results of this table 2 show that the main leachable elements, thus constituting the pollutants, are the anions, in particular the sulfates and the chlorides. The contents of leached sulfates have the consequence of placing the earth in class II according to Directive 1999/31/EC of the Council of Apr. 26, 1999 for the landfilling thereof. The value of the soluble fraction SF of between 0.4% and 6% also brings about classification in category II.

Sample 2 is selected as reference to measuring the effectiveness of the various binders in the examples below.

Example 1 (Comparative)

Sample 3

Sample 3 corresponds to the treatment of a sample of earth from the Port of Paris with 10% (by weight) of a binder sold by Holcim under the trade name Inercem. The amount of water used in the preparation of this sample corresponds to a Water/Binder ratio equal to 1.

Example 2

Sample 4

Sample 4 corresponds to the treatment of a sample of earth from the Port of Paris with 10% (by weight) of a sulfoaluminate hydraulic binder consisting of clinker 1 (100% of clinker 1). The amount of water used in the preparation of this sample corresponds to a Water/Binder ratio equal to 1.

Example 3

Sample 5

Sample 5 corresponds to the treatment of a sample of earth from the Port of Paris with 10% (by weight) of a sulfoaluminate hydraulic binder consisting of clinker 2 (100% of clinker 2). The amount of water used in the preparation of this sample corresponds to a Water/Binder ratio equal to 1.

The results of the leaching tests carried out on samples 3, 4 and 5, compared with the reference sample 2, are combined in table 3.

TABLE 3

|  | Sample 2 (reference) | Sample 3 (comparative) | Sample 4 (clinker 1) | Sample 5 (clinker 2) |
| --- | --- | --- | --- | --- |
| As | <0.2 | <0.3 | <0.3 | <0.2 |
| Ba | 0.471 | 0.425 | 0.865 | 1.45 |
| Cd | 0.114 | <0.1 | <0.1 | <0.1 |
| Cu | 0.253 | <0.2 | 0.221 | 0.2 |
| Hg | <0.1 | <0.1 | <0.1 | <0.001 |
| Ni | 0.127 | <0.1 | <0.1 | <0.1 |
| Pb | 0.115 | <0.35 | <0.35 | <0.1 |
| Sb | <0.2 | <0.5 | <0.5 | <0.2 |
| Se | <0.2 | <0.4 | <0.4 | <0.2 |
| Zn | 0.375 | <0.2 | <0.2 | <0.1 |
| $Cl^-$ | 68.7 | 59 | 56 | 28 |
| $SO_4^{2-}$ | 6859 | 8968 | 1082 | 951 |
| SF % | 1.18 | 1.32 | 0.52 | 0.57 |

It is observed that the use of Inercem does not make it possible to reduce the soluble fraction of the earth, unlike the sulfoaluminate hydraulic binders according to the invention.

More particularly, the treatment with the Inercem binder does not make it possible to lower the amount of sulfates entrained (released) in the leachate, unlike the treatments with the sulfoaluminate hydraulic binder according to the invention, for which the content of sulfate ions is divided by a factor of approximately 7. In addition, the binder based on clinker 2 makes it possible to lower the amount of sulfates entrained (released) below the threshold of 1000 ppm imposed by the Directive (Directive 1999/31/EC of the Council of Apr. 26, 1999) for the downgrading of the wastes from category II to category III.

Example 4

Comparison of the Effectiveness of the Three Hydraulic Binder Compositions

Sample 6

Sample 6 corresponds to the treatment of a sample of earth from the Port of Paris with 20% (by weight) of a sulfoaluminate hydraulic binder consisting of clinker 1 (100% of clinker 1).

Sample 7

Sample 7 corresponds to the treatment of a sample of earth from the Port of Paris with 20% (by weight) of a sulfoaluminate hydraulic binder consisting of clinker 2 (100% of clinker 2).

Sample 8

Sample 8 corresponds to the treatment of a sample of earth from the Port of Paris with 20% (by weight) of a sulfoaluminate hydraulic binder consisting of clinker 3 (100% of clinker 3).

For these three samples 6, 7 and 8, the amount of water used corresponds to a Water/Binder ratio equal to 1.

The results of the leaching tests on the three samples of earth treated by the process according to the invention are combined in table 4.

TABLE 4

| | Sample 2 (reference) | Sample 6 (20% clinker 1) | Sample 7 (20% clinker 2) | Sample 8 (20% clinker 3) |
|---|---|---|---|---|
| As | <0.2 | <0.3 | <0.2 | <0.2 |
| Ba | 0.471 | 0.594 | 1.428 | 1.157 |
| Cd | 0.114 | <0.1 | <0.1 | <0.1 |
| Cu | 0.253 | 0.396 | <0.2 | <0.2 |
| Hg | <0.1 | <0.001 | <0.001 | <0.001 |
| Ni | 0.127 | <0.1 | <0.1 | <0.1 |
| Pb | 0.115 | <0.350 | <0.350 | <0.350 |
| Sb | <0.2 | <0.5 | <0.5 | <0.5 |
| Se | <0.2 | <0.4 | <0.4 | <0.2 |
| Zn | 0.375 | <0.2 | <0.2 | <0.2 |
| Cl$^-$ | 68.7 | 36 | 33 | 38 |
| SO$_4^{2-}$ | 6859 | 817 | 267 | 468 |
| SF % | 1.18 | 0.62 | 0.92 | 0.81 |

It is noticed that the treatment with a high proportion of binder makes it possible, in each case, to lower the amount of sulfates entrained (released) far below the threshold of 1000 ppm imposed by the Directive (Directive 1999/31/EC of the Council of Apr. 26, 1999) for the downgrading of the waste.

The content of chlorides is halved in the leachate from the soils treated with 20% of the binder based on sulfoaluminate clinker according to the invention.

Example 5

Treatment Based on Clinker 1 with Different Proportions of Binder

The values presented in tables 3 and 4, relating to the sulfoaluminate hydraulic binder consisting of clinker 1, are combined in table 5, comparing the effectiveness of the treatments of the contaminated material with different proportions of binder.

TABLE 5

| | Sample 2 (reference) | Sample 4 (10% binder) | Sample 6 (20% binder) |
|---|---|---|---|
| As | <0.2 | <0.3 | <0.3 |
| Ba | 0.471 | 0.865 | 0.594 |
| Cd | 0.114 | <0.1 | <0.1 |
| Cu | 0.253 | 0.221 | 0.396 |
| Hg | <0.1 | <0.1 | <0.001 |
| Ni | 0.127 | <0.1 | <0.1 |
| Pb | 0.115 | <0.35 | <0.350 |
| Sb | <0.2 | <0.5 | <0.5 |
| Se | <0.2 | <0.4 | <0.4 |
| Zn | 0.375 | <0.2 | <0.2 |
| Cl$^-$ | 68.7 | 56 | 36 |
| SO$_4^{2-}$ | 6859 | 1082 | 817 |
| SF | 1.18 | 0.52 | 0.62 |

It is observed that the stabilization of the chlorides and sulfates depends on the amount of binder used.

Example 6

Treatment with Different Proportions of Binder Based on Clinker 2

Samples 9, 10 and 11 correspond to the treatment of a sample of earth from the Port of Paris with respectively 5%, 15% and 40% (by weight) of a sulfoaluminate hydraulic binder consisting exclusively of clinker 2. The amount of water used in preparing these samples corresponds to a Water/Binder ratio equal to 1.

The results of these last three samples and also the preceding samples 5 and 7, produced with proportions of binder respectively of 10% and 20% by weight with respect to the contaminated material, are combined in table 6.

TABLE 6

| % Binder | Sample 9 (5%) | Sample 5 (10%) | Sample 10 (15%) | Sample 7 (20%) | Sample 11 (40%) |
|---|---|---|---|---|---|
| As | <0.2 | <0.2 | <0.2 | <0.2 | <0.2 |
| Ba | 1.4 | 1.45 | 1.445 | 1.428 | 1.146 |
| Cd | <0.1 | <0.1 | <0.1 | <0.1 | <0.1 |
| Cu | <0.2 | 0.2 | <0.2 | <0.2 | <0.2 |
| Hg | <0.001 | <0.001 | <0.001 | <0.001 | <0.001 |
| Ni | <0.1 | <0.1 | <0.1 | <0.1 | <0.1 |
| Pb | <0.1 | <0.1 | <0.1 | <0.350 | 0.178 |
| Sb | <0.2 | <0.2 | <0.2 | <0.5 | <0.2 |
| Se | <0.2 | <0.2 | <0.2 | <0.4 | <0.2 |
| Zn | <0.1 | <0.1 | <0.1 | <0.2 | <0.1 |
| Cl$^-$ | 44 | 28 | 26 | 33 | 25 |
| SO$_4^{2-}$ | 2662 | 951 | 640 | 267 | 238 |
| SF | 0.68 | 0.57 | 0.68 | 0.92 | 0.77 |

It is also observed, with this binder, that the stabilization of the sulfates of the earth depends on the amount of sulfoaluminate hydraulic binder used. The change in the concentrations of the sulfates in the leachates of the treated earths shows that the effectiveness of the stabilization increases significantly with the amount of sulfoaluminate hydraulic binder used for the treatment. Beyond 10%, the stabilization of the sulfates also improves but at a lesser rate.

These results are represented diagrammatically in the appended FIGURE. The graph represents the variation in content of sulfate ions, expressed in ppm (or mg/kg of treated material), in the leachate (represented on the axis of the ordinates) as a function of the percentage by weight of hydraulic binder based on clinker 2 used to treat the contaminated soil (represented on the axis of the abscissa).

Example 7

A further sampling of earth from the Port of Paris was carried out in another region of this polluted ground and divided into several fractions.

A first crude fraction (sample 12) was subjected to leaching under the same conditions as above and constitutes the reference for this example 7.

A second fraction (sample 13) was treated with 10% of hydraulic binder according to the invention, including 70% of clinker 2 and 30% of white Portland cement of CEM 152.5 N type, and then subjected to leaching.

The results of the analyses carried out on these two leachates are presented in table 7.

These results show that, even at 70% of clinker according to the invention in the hydraulic binder, the content of sulfates in the leachate is divided by 6 and the content of chlorides is divided by 2.

TABLE 7

| | Sample 12 (reference) | Sample 13 (10% binder) |
|---|---|---|
| As | <0.2 | <0.2 |
| Ba | 0.39 | 0.52 |
| Cd | <0.1 | <0.1 |
| Cu | 0.21 | 0.51 |
| Hg | <0.1 | <0.1 |
| Ni | <0.1 | <0.1 |
| Pb | <0.1 | <0.1 |
| Sb | 0.22 | <0.2 |
| Se | <0.2 | <0.2 |

TABLE 7-continued

|   | Sample 12 (reference) | Sample 13 (10% binder) |
|---|---|---|
| Zn | 0.33 | <0.2 |
| Cl⁻ | 62 | 27 |
| $SO_4^{2-}$ | 10 274 | 1547 |
| SF | 1.35 | 0.55 |

The combined results from these tests clearly demonstrates that the novel clinker is capable, mixed at a low concentration (in particular of less than 15% by weight) with a polluted material, in particular a material polluted by sulfate and chloride ions, of considerably reducing their content in the leachate, thus contributing to rendering this material inert, without necessitating the coating thereof.

Example 8: Treatment with Pure Mineralogical Phases

A third batch of earth from the Port of Paris is considered in example 8. A crude fraction was subjected to leaching under the same conditions as above and constitutes the reference (sample 14) for this example 8.

Samples 15 to 19 correspond to the results of leaching fractions of the same third batch of earth from the Port of Paris but treated with binders obtained from pure mineralogical phases and optionally from quick lime, that is to say that the clinkers used do not originate from a cement furnace but from a laboratory. These samples are compared with the reference sample 14.

Sample 15 corresponds to the treatment of a sample of earth from the Port of Paris (same source as the reference sample 14) with 5% (by weight) of a hydraulic binder according to the invention including 20% of ye'elimite (Y), 50% of mayenite (M) and 30% of quick lime (CaO) (20% Y/50% M/30% CaO). The amount of water used in preparing this sample corresponds to a Water/Binder ratio equal to 1. The results of the analysis of the leachate are presented in table 8.

Sample 16 corresponds to the treatment of a sample of earth from the Port of Paris (same source as the reference sample 14) with 5% (by weight) of a hydraulic binder according to the invention including 20% of ye'elimite, 70% of mayenite and 10% of quick lime (20% Y/70% M/10% CaO). The amount of water used in preparing this sample corresponds to a Water/Binder ratio equal to 1. The results of the analysis of the leachate are presented in table 8.

TABLE 8

|   | Sample 14 (reference) | Sample 15 (20% Y/50% M/30% CaO) | Sample 16 (20% Y/70% M/10% CaO) |
|---|---|---|---|
| As | <0.2 | <0.2 | <0.2 |
| Ba | 0.438 | 0.754 | 1.501 |
| Cd | <0.1 | <0.04 | <0.04 |
| Cu | <0.2 | 0.276 | 0.109 |
| Hg | 0.004 | 0.011 | 0.011 |
| Ni | <0.1 | <0.05 | <0.05 |
| Pb | <0.1 | 0.636 | <0.1 |
| Sb | <0.2 | <0.06 | <0.06 |
| Se | <0.2 | <0.08 | <0.08 |
| Zn | <0.2 | <0.05 | <0.05 |
| Cl⁻ | 181 | 115 | 118 |
| $SO_4^{2-}$ | 4696 | 320 | 59 |
| SF | 0.91 | 0.87 | 1.44 |

Sample 17 corresponds to the treatment of a sample of earth from the Port of Paris (same source as the reference sample 14) with 5% (by weight) of a hydraulic binder according to the invention including 50% of ye'elimite and 50% of mayenite (50% Y/50% M) without addition of lime. The amount of water used in preparing this sample corresponds to a Water/Binder ratio equal to 1. The results of the analysis of the leachate are presented in table 9.

Sample 18 corresponds to the treatment of a sample of earth from the Port of Paris (same source as the reference sample 14) with 5% (by weight) of a hydraulic binder according to the invention including 40% of ye'elimite, 40% of mayenite and 20% of quick lime (40% Y/40% M/20% CaO). The amount of water used in preparing this sample corresponds to a Water/Binder ratio equal to 1. The results of the analysis of the leachate are presented in table 9.

Sample 19 corresponds to the treatment of a sample of earth from the Port of Paris (same source as the reference sample 14) with 5% (by weight) of a hydraulic binder according to the invention including 30% of ye'elimite, 30% of mayenite and 40% of quick lime (30% Y/30% M/40% CaO). The amount of water used in preparing this sample corresponds to a Water/Binder ratio equal to 1. The results of the analysis of the leachate are presented in table 9.

TABLE 9

|   | Sample 14 (reference) | Sample 17 (ref) (50% Y/50% M) | Sample 18 (40% Y/40% M/20% CaO) | Sample 19 (30% Y/30% M/40% CaO) |
|---|---|---|---|---|
| As | <0.2 | <0.2 | <0.2 | <0.2 |
| Ba | 0.438 | 0.408 | 0.650 | 0.768 |
| Cd | <0.1 | <0.05 | <0.05 | <0.05 |
| Cu | <0.2 | 0.172 | 0.172 | 0.451 |
| Hg | 0.004 | 0.073 | 0.005 | 0.004 |
| Ni | <0.1 | <0.05 | <0.05 | <0.05 |
| Pb | <0.1 | <0.1 | <0.1 | <0.1 |
| Sb | <0.2 | <0.1 | <0.1 | <0.1 |
| Se | <0.2 | <0.1 | <0.1 | <0.1 |
| Zn | <0.2 | 0.061 | <0.05 | <0.05 |
| Cl⁻ | 181 | 174 | 154 | 122 |
| $SO_4^{2-}$ | 4696 | 1011 | 364 | 305 |
| SF | 0.91 | 0.66 | 1.14 | 0.76 |

It is found that the combination of the three constituents ye'elimite, mayenite and lime is optimal for the trapping of the sulfate ions.

The invention claimed is:

1. A hydraulic binder based on sulfoaluminate clinker, said clinker comprising ye'elimite ($C_4A_3\$$) mineralogical phase, mayenite ($C_{12}A_7$) mineralogical phase, free lime (CaO) and optionally belite ($C_2S$) mineralogical phase, wherein, in said clinker, the ye'elimite ($C_4A_3\$$) mineralogical phase, mayenite ($C_{12}A_7$) mineralogical phase and free lime are present in the following proportions: from 20% to 50% by weight of ye'elimite ($C_4A_3\$$) phase, from more than 10% to 50% by weight of mayenite ($C_{12}A_7$) phase, and from 1% to 5% by weight of free lime (CaO), and the ratio by weight of the mayenite ($C_{12}A_7$) phase to the ye'elimite ($C_4A_3\$$) phase being between 0.1 and 10.

2. The binder as claimed in claim 1, wherein the clinker additionally comprises up to 5% by weight of C$ phase.

3. The binder as claimed in claim 1, wherein, in the clinker, the ratio by weight of the mayenite ($C_{12}A_7$) phase to the ye'elimite ($C_4A_3\$$) phase is between 0.1 and 2.5.

4. The binder as claimed in claim 1, wherein the clinker includes less than 0.5% by weight of $CA_2$ phase and less than 0.5% by weight of $C_2AS$ phase.

5. The binder as claimed in claim 1, wherein said binder includes at least 20%, by weight of sulfoaluminate clinker and one or more compound(s) selected from the group consisting of cement, Portland clinker, lime, a filler, and admixtures having a pozzolanic effect; and optionally at least one accelerator additive, or optionally a chromium reducer additive, or optionally both an accelerator additive and a chromium reducer additive.

6. The binder as claimed in claim 5, wherein said hydraulic binder includes quick lime that is less than 50% by weight of lime.

7. The binder as claimed in claim 3, wherein, in the clinker, the ratio by weight of the mayenite ($C_{12}A_7$) phase to the ye'elimite ($C_4A_3\$$) phase is between 0.15 and 1.5.

8. A process for the treatment of polluted soils exhibiting a leachable fraction of greater than 0.4%, said leachable fraction predominantly including sulfate ions, and/or heavy metal cations, wherein said process comprises the mixing of said soil with a hydraulic binder as claimed in claim 1, in binder/soil proportions by weight of between 1 and 40 parts of binder per 100 parts of soil.

9. The process as claimed in claim 8, wherein said process further comprises the mixing of said soil with the hydraulic binder in binder/soil proportions by weight of between 1 and 20 parts, of binder per 100 parts of soil.

10. A process according to claim 8 for stabilizing polluted soils in situ or before landfilling, said soils being optionally also polluted by chloride ions.

11. The process as claimed in claim 10, wherein the soil to be stabilized includes a water content of less than 40% by weight.

12. Road bases or backfills comprising the soil treated according to claim 8.

13. The process as claimed in claim 9, wherein said process further comprises the mixing of said soil with the hydraulic binder in binder/soil proportions by weight of between 2 and 20 parts, of binder per 100 parts of soil.

14. The process as claimed in claim 9, wherein said process further comprises the mixing of said soil with the hydraulic binder in binder/soil proportions by weight of between 5 and 20 parts, of binder per 100 parts of soil.

15. The process as claimed in claim 11, wherein the soil to be stabilized includes a water content of less than 30% by weight.

\* \* \* \* \*